(12) United States Patent
Qiu et al.

(10) Patent No.: US 10,964,933 B2
(45) Date of Patent: Mar. 30, 2021

(54) ELECTRODE PLATE PROCESSING DEVICE

(71) Applicant: CONTEMPORARY AMPEREX TECHNOLOGY CO., LIMITED, Ningde (CN)

(72) Inventors: Shaojun Qiu, Ningde (CN); Nengwu Liao, Ningde (CN); Tao Zhang, Ningde (CN); Tiefeng Wu, Ningde (CN); Yuhuai Yang, Ningde (CN); Xiangqiang Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 90 days.

(21) Appl. No.: 16/351,766

(22) Filed: Mar. 13, 2019

(65) Prior Publication Data

US 2019/0372087 A1 Dec. 5, 2019

(30) Foreign Application Priority Data

May 31, 2018 (CN) .......................... 201810553569.9

(51) Int. Cl.
*B23K 26/16* (2006.01)
*B23K 26/38* (2014.01)
(Continued)

(52) U.S. Cl.
CPC ........... *H01M 4/0435* (2013.01); *B23K 26/16* (2013.01); *B23K 26/38* (2013.01); *B23K 26/142* (2015.10);
(Continued)

(58) Field of Classification Search
CPC .. B23K 26/08; B23K 26/083; B23K 26/0846; B23K 26/142; B23K 26/1435;
(Continued)

(56) References Cited

U.S. PATENT DOCUMENTS

| | | | | |
|---|---|---|---|---|
| 4,916,272 A | * | 4/1990 | Okumoto | B23K 26/067 131/281 |
| 8,398,063 B2 | * | 3/2013 | Ebert | B65H 45/22 270/41 |

(Continued)

FOREIGN PATENT DOCUMENTS

| | | | |
|---|---|---|---|
| CN | 204818448 U | * | 12/2015 |
| CN | 106735937 A | | 5/2017 |

(Continued)

OTHER PUBLICATIONS

Translation of CN-108393597-A (Year: 2018).*
Translation of CN-204818448-U (Year: 2015).*
Translation of CN106735937A (Year: 2017).*

(Continued)

*Primary Examiner* — Matthew P Travers
(74) *Attorney, Agent, or Firm* — Tucker Ellis LLP

(57) ABSTRACT

The present disclosure relates to an electrode plate processing device. The electrode plate processing device includes: an electrode plate cutting mechanism having a cutting position; and an electrode plate rolling mechanism, through which an electrode plate passes. The electrode plate rolling mechanism includes a first roller and a second roller. The first roller has a vacuum adsorption zone for adsorbing a waste edge of the electrode plate. The cutting position is provided in upstream of the vacuum adsorption zone along a conveying direction of the electrode plate processing device.

7 Claims, 2 Drawing Sheets

(51) Int. Cl.
*B23K 26/142* (2014.01)
*H01M 4/04* (2006.01)
*B23K 101/16* (2006.01)
*B23K 101/38* (2006.01)

(52) U.S. Cl.
CPC ...... *B23K 2101/16* (2018.08); *B23K 2101/38* (2018.08); *H01M 4/04* (2013.01)

(58) Field of Classification Search
CPC ...... B23K 26/16; B23K 26/351; B23K 26/38; B23K 26/70–702; B23K 37/0408; B23K 2101/16; B23K 2101/38; H01M 4/04; H01M 4/13; H01M 4/8875; H01M 4/8878; H01M 10/04; B65G 13/07; B65G 39/04; B65H 27/00
See application file for complete search history.

(56) References Cited

U.S. PATENT DOCUMENTS

| | | | | |
|---|---|---|---|---|
| 9,694,445 B2* | 7/2017 | Chen | .................. | B23K 26/0846 |
| 2018/0079035 A1* | 3/2018 | Watanabe | .............. | B23K 26/08 |

FOREIGN PATENT DOCUMENTS

| | | | |
|---|---|---|---|
| CN | 107745192 A | | 3/2018 |
| CN | 107813063 A | | 3/2018 |
| CN | 108393597 A | * | 8/2018 |

OTHER PUBLICATIONS

Extended European Search Report from corresponding European Application No. 19156365.9, dated Aug. 28, 2019, 7 pages.

* cited by examiner

ELECTRODE PLATE PROCESSING DEVICE

CROSS-REFERENCE TO RELATED APPLICATIONS

The present application claims priority to Chinese Patent Application No. 201810553569.9, filed on May 31, 2018, the content of which is incorporated herein by reference in its entirety.

TECHNICAL FIELD

The present disclosure relates to the technical field of processing energy storage component, and in particular, relates to an electrode plate processing device.

BACKGROUND

In the modern society, in order to alleviate the environmental problems, electric vehicles have been widely used, followed by a rapid development of power battery industry.

In a process of manufacturing a power battery, it is necessary to cut electrode plates of different specifications according to various application situations, and the traditional mechanical die cutting process is far from satisfaction. Therefore, at present, a laser cutting process is usually adopted for the electrode plate die cutting.

However, when a laser is used for die-cutting an electrode plate, unsmooth guiding of waste edge may result in shaking and bulging at the laser-cutting point, which is likely to cause a defocus of the laser. Then, the electrode plate cannot be cut, and a formation of a tab will be finally affected, thereby degrading the quality and performance of the power battery.

SUMMARY

The present disclosure provides an electrode plate processing device, which can reduce the detects such as shaking and bugling of the waste edge and thus enhance the quality and performance of the power battery.

The present disclosure provides an electrode plate processing device. The electrode plate processing device includes: an electrode plate cutting mechanism having a cutting position; and an electrode plate rolling mechanism, through which an electrode plate passes. The electrode plate rolling mechanism includes a first roller and a second roller that are connected to a same shaft and separated from one another. The first roller has a vacuum adsorption zone for adsorbing a waste edge of the electrode plate. The cutting position is provided in upstream of the vacuum adsorption zone along a conveying direction of the electrode plate processing device.

Further, the first roller is rotationally arranged.

Further, the electrode plate processing device further includes a driving mechanism. The driving mechanism includes a driving portion and a transmission portion, and the driving portion drives the first roller to rotate via the transmission portion.

Further, the transmission portion is wound around the first roller and has a dodging structure that allows the vacuum adsorption zone to be exposed.

Further, the transmission portion includes a pulley and a belt that are coupled to each other in a transmission way, the belt is wound around the pulley and the first roller, and the dodging structure includes a through-hole provided in the belt.

Further, the electrode plate processing device further includes a tensioning mechanism. The transmission portion is tensioned by the tensioning mechanism, so as to increase a transmission moment of the transmission portion.

Further, the second roller is rotationally arranged.

Further, the electrode plate processing device further includes a dust collecting mechanism. The dust collecting mechanism includes a collecting box and a first air suction assembly, and the collecting box includes a dust inlet and a dust receiving chamber. The cutting position faces the dust inlet. The first air suction assembly communicates with the dust receiving chamber.

Further, the electrode plate processing device further includes a waste collecting mechanism disposed in downstream of the vacuum adsorption zone along the conveying direction.

Further, the electrode plate processing device further includes a second air suction assembly communicating with the waste collecting mechanism, so as to produce a negative pressure in the waste collecting mechanism.

The technical solutions according to the present disclosure bring the following beneficial effects:

It should be understood that the above general description is merely illustrative, but not intended to limit the present disclosure.

REFERENCE SIGNS

10—electrode plate cutting mechanism;
100—cutting position;
20—electrode plate rolling mechanism
200—shaft portion;
202—first roller;
2020—vacuum adsorption zone;
204—second roller;
30—transmission portion;
300—pulley;
302—belt;
3020—through-hole;
40—tensioning mechanism;
50—collecting box;
500—connecting hole;
60—transmission roller;
70—electrode plate;
700—waste edge.

Accompanying drawings illustrating embodiments according to the present disclosure are incorporated in the description as a part, and used to elaborate the principle of the present disclosure.

DESCRIPTION OF EMBODIMENTS

The present disclosure will be further described below by specific embodiments of the present disclosure in combination with the drawings.

It should be understood that terms indicating orientations or positions, such as "up", "down", "left", "right", etc., generally are used to describe the orientations or positions with reference to the drawings, and thus should not be construed as a limitation of the present disclosure. It also should be understood that when an element is referred as being "on" or "under" another element, the element can be directly located "on" or "under" another element or connected to another element with an intermediate element.

Figure 1:
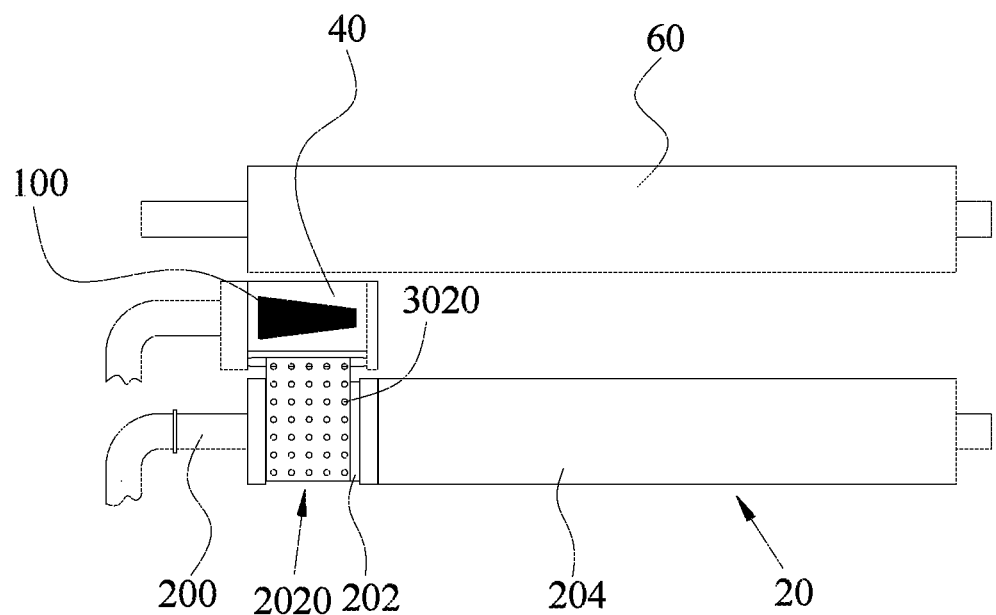
FIG. 1 is a top view of a partial structure of an electrode plate processing device according to an embodiment of the present disclosure.
Figure 2:
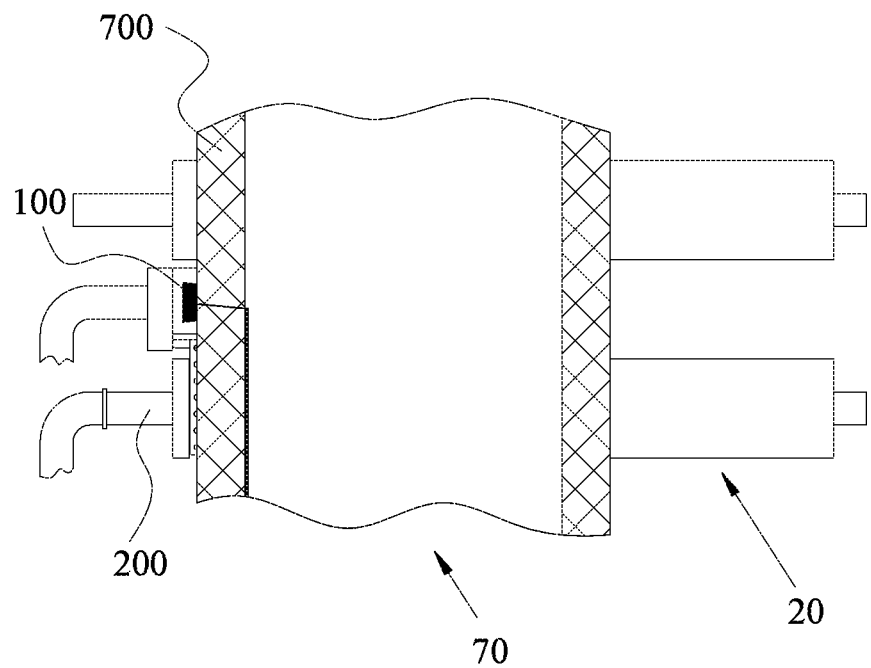
FIG. 2 is a schematic diagram of an electrode plate being conveyed to an electrode plate processing device according to an embodiment of the present disclosure.
Figure 3:
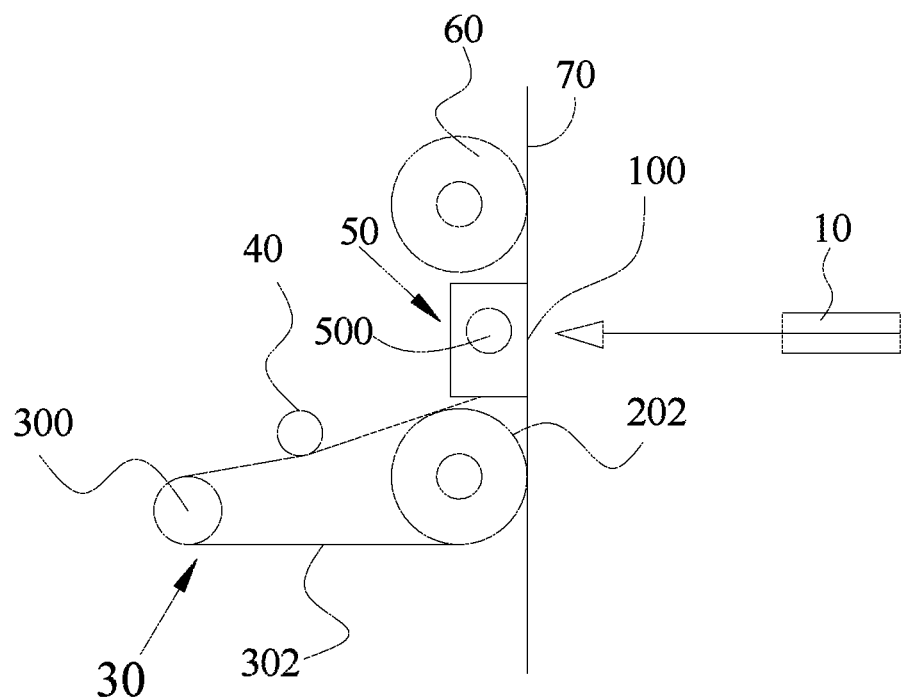
FIG. 3 is a left view of a partial structure of an electrode plate processing device according to an embodiment of the present disclosure.

FIG. 1 is a top view of a partial structure of an electrode plate processing device, FIG. 2 is a schematic diagram of an electrode plate being conveyed to an electrode plate processing device, and FIG. 3 is a left view of a partial structure of an electrode plate processing device.

The electrode processing device can cut out a tab during conveying of the electrode plate 70. This can ensure the forming quality of the tab, and thus enhance the quality and performance of the power battery.

Specifically, as shown in FIGS. 1 to 3, the electrode plate processing device includes an electrode plate cutting mechanism 10 and an electrode plate rolling mechanism 20. The electrode plate cutting mechanism 10 can adopt laser cutting. The electrode plate cutting mechanism 10 has a cutting position 100, which can be understood as a position where the electrode plate 70 is cut.

The electrode plate 70 passes through the electrode plate rolling mechanism 20 during a process of the electrode plate 70 being conveyed. The electrode plate rolling mechanism 20 can be fixedly or rotationally arranged, which is not specifically limited in the present disclosure.

The electrode plate rolling mechanism 20 includes a shaft portion 200 and a first roller 202 and a second roller 204 that are connected to the shaft portion 200. The first roller 202 has a vacuum adsorption zone 2020, which can be used to adsorb the waste edge 700 of the electrode plate 70, such that the waste edge 700 of the electrode plate 70 can be adsorbed on the first roller 202 through the vacuum adsorption zone 2020 during conveying of the electrode plate. At this time, the vacuum adsorption zone 2020 can isolate the shaking transmitted from the waste in downstream of the first roller 202. Correspondingly, it can reduce a risk of the shaking and bulging of the waste edge 700 in upstream of the vacuum adsorption zone 2020. Therefore, by arranging the cutting position 100 in upstream of the vacuum adsorption zone 2020, a risk of laser defocusing occurring in the electrode plate cutting mechanism 10 also can be lowered, and thus the forming quality of the tab and performance of the power battery can be enhanced.

In an embodiment, the cutting position 100 is immediately adjacent to the vacuum adsorption zone 2020. It is easy to understand that, due to the presence of adsorption force, the closer the cutting position 100 to the vacuum adsorption zone 2020 is, the lower the risk of shaking and bulging of the electrode plate is, which is more conductive to the cutting.

As used herein, "upstream" and "downstream" respectively mean that, along a conveying direction of the electrode plate, the front position of two positions to be compared is taken as upstream, while the back position is taken as downstream.

The first roller 202 can be provided as a cylindrical body, and a vacuum hole can be provided on a cylindrical wall of the first roller 202. A negative pressure gas source communicates with the inner cavity of the first roller 202. When the negative pressure gas source is engaged, a position where the first roller 202 is provided with the vacuum hole forms the vacuum adsorption zone 2020.

In a specific embodiment, in order to reduce friction generated between the first roller 202 and the electrode plate during conveying of the electrode plate, the first roller 202 can be rotationally arranged. A linear speed of the first roller 202 during the operating process can be set to be greater than a conveying speed of the electrode plate. In this way, there is a speed difference between the linear speed of the first roller 202 and the conveying speed of the electrode plate, and the linear speed of the first roller 202 is greater than the conveying speed of the electrode plate, such that the electrode plate is subjected to a great tensile force and thus always in a tension state. As a result, in the upstream of the vacuum adsorption zone 2020, a material accumulation of the electrode plate is less likely to occur, thereby further ensuring the forming quality of the tab.

In the technical solution in which the first roller 202 is rotationally arranged, the vacuum holes are evenly arranged on the wall of the first roller 202. In this case, the entire wall of the first roller 202 serves as the vacuum adsorption zone 2020, such that the first roller 202 can always exert an adsorption force on the passing electrode plate.

The first roller 202 can be rotated by a drive mechanism, such as a drive motor and the like. However, since the drive mechanism itself may cause vibration, it is easy to transmit its own vibration to the first roller 202, which is in a direct coupling with the drive mechanism in a transmission way, thereby resulting in more severe shaking of the electrode plate.

Thus, as shown in FIG. 3, according to the present disclosure, the driving mechanism includes two portions, i.e., a driving portion (not shown in FIG. 3) and a transmission portion 30 that are coupled to each other in a transmission way. The driving portion functions as a power output component, and the transmission portion serves as an intermediate connecting component. The driving portion drives the first roller 202 to rotate via the transmission portion 30, thereby alleviating the vibration from the driving portion and lowering the risk of shaking of the electrode plate.

In an embodiment, the transmission portion 30 can be directly coupled to the shaft portion 200 of the electrode plate rolling mechanism 20 in a transmission way. In this case, since the first roller 202 and the shaft portion 200 can be relatively fixed, when the shaft portion 200 is driven to rotate by the transmission portion 30, the first roller 202 will rotate correspondingly.

In another embodiment, the first roller 202 can also be sleeved outside the shaft portion 200 through a bearing. In this case, the transmission portion 30 can be directly coupled with the first roller 202 in a transmission way.

In the embodiment shown in FIG. 3, the transmission portion 30 is provided as a belt transmission assembly including a pulley 300 and a belt 302. The belt 302 is wound around the pulley 300 and the first roller 202. In addition, in order to prevent the vacuum absorption zone 2020 from being covered by the belt 302, the belt 302 can be further configured to have a dodging structure, such that the vacuum adsorption zone 2020 can be exposed through the dodging structure.

It should be noted that the transmission portion 30 is not limited to the belt transmission assembly, but also can be a chain transmission assembly. However, comparing with a chain transmission assembly, the belt transmission assembly can better mitigate and absorb vibrations with low noise produced during transmission.

The dodging structure can be formed by providing a through-hole 3020 in the belt 302. The belt can be provided with a plurality of through-holes 3020, and the plurality of through-holes 3020 and the vacuum holes are arranged in one-to-one correspondence (see FIG. 1). In the present disclosure, the term "the plurality of" means at least two.

It should be understood that the dodging structure may vary depending on different embodiments of the transmission portion 30.

Further, in order to prevent the belt 302 from slipping, the electrode plate processing device further includes a tensioning mechanism 40. The tensioning mechanism 40 can adjust a wrap angle between the belt 302 and the pulley 300, so as to enlarge the contact area between the pulley 300 and the belt 302, thereby increasing friction and enhancing transmission efficiency.

In the present embodiment, the tensioning mechanism 40 can be provided as a tensioning pulley, and the belt 302 is wound around the tensioning pulley.

Further referring to FIG. 1, the second roller 204 can also be rotationally arranged. With such arrangement, during conveying of the electrode plate, the friction between the second roller 204 and the electrode plate 70 can be correspondingly reduced.

In some embodiments, the second roller 204 can be either relatively fixed with respect to the shaft portion 200, or sleeved on the shaft portion 200 through a bearing so as to be relatively rotatable with respect to the shaft portion 200.

However, it should be noted that the movement of the first roller 202 and the movement of the second roller 204 can be independent to each other. That is, the first roller 202 and the second roller 204 are not required to rotate in a synchronous manner, even if both of them can be rotated with respect to the shaft portion 200, and respective driving force applying components can also be set to be different.

In the present embodiment, the second roller 204 can be rotated by the frictional force generated when electrode plate is conveyed, such that a number of required driving mechanisms can be reduced, thereby improving compactness of the electrode plate processing device. However, there are other embodiments for achieving the rotation of the second roller 204.

It is easy to understand that the cutting process of the electrode plate can produce dust, which pollutes an environment and impairs operators' health. Therefore, the electrode plate processing device can further include a dust collecting mechanism, which can intensively collect the dust within a designated area, thereby preventing it from spreading.

Specifically, the dust collecting mechanism can include a collecting box 50 and a first air suction assembly. The collecting box 50 is provided with a connecting hole 500, and the first air suction assembly is connected to the connecting hole 500.

The collecting box 50 can be used to receive dust, and the collection box 50 includes a dust inlet and a dust receiving chamber. The dust can enter the dust receiving chamber through the dust inlet. The dust inlet can be set to face the cutting position 100 in such a manner that a path through which the dust enters the dust receiving chamber can be reduced and thus a diffusion of the dust can be reduced.

In addition, the dust collecting mechanism further includes a first air suction assembly communicating with the dust receiving chamber. When the first air suction assembly is operating, the dust can quickly enter the dust receiving chamber through the dust inlet, and can be conveyed to a designated area through a pipeline of the first air suction assembly.

In addition, the electrode plate processing device further includes a waste collecting mechanism disposed in downstream of the vacuum adsorption zone 2020, such that the severed waste edge 700 can be collected by the waste collecting mechanism and can be subsequently processed.

Similarly, the waste collecting mechanism can further include a second air suction assembly communicating with a container in the waste collecting mechanism. The second air suction assembly can produce a negative pressure in the waste collecting mechanism, so as to draw the waste edge 700 into the waste collecting mechanism.

Further, the electrode plate processing device can further include a plurality of transmission rollers 60. The plurality of transmission rollers 60 is arranged in sequence along a conveying path of the electrode plate 70, so as to provide a driving force for conveying the electrode plate 70.

The embodiments according to the present disclosure discussed above are merely illustrative embodiments, but not intended to limit the present disclosure. The technical solution according to the present disclosure can be modified in various manners. Any modifications, equivalent replacements, improvements within the spirit and principles of the present disclosure should be included in the scope of protection of the present disclosure.

What is claimed is:

1. An electrode plate processing device, comprising:
   a driving mechanism comprising a driving portion and a transmission portion,
   an electrode plate cutting mechanism adopting laser cutting and having a cutting position; and
   an electrode plate rolling mechanism, through which an electrode plate passes,
   wherein the electrode plate rolling mechanism comprises a first roller and a second roller that are connected to a same shaft and separated from one another, the first roller has a vacuum adsorption zone for adsorbing a waste edge of the electrode plate, and the cutting position is provided upstream of the vacuum adsorption zone along a conveying direction of the electrode plate processing device,
   the driving portion drives the first roller to rotate via the transmission portion, and
   the first roller is rotationally arranged, the second roller is rotationally arranged, and rotation of the first roller and rotation of the second roller are independent to each other.

2. The electrode plate processing device according to claim 1, wherein the transmission portion is wound around the first roller and has a dodging structure that allows the vacuum adsorption zone to be exposed.

3. The electrode plate processing device according to claim 2, wherein the transmission portion comprises a pulley and a belt that are coupled to each other in a transmission way, the belt is wound around the pulley and the first roller, and the dodging structure comprises a through-hole provided in the belt.

4. The electrode plate processing device according to claim 1, further comprising a tensioning mechanism, wherein the transmission portion is tensioned by the tensioning mechanism, so as to increase a transmission moment of the transmission portion.

5. The electrode plate processing device according to claim 1, further comprising a dust collecting mechanism, wherein the dust collecting mechanism comprises a collecting box and a first air suction assembly, and the collecting box comprises a dust inlet and a dust receiving chamber,
   the cutting position faces the dust inlet, and
   the first air suction assembly communicates with the dust receiving chamber.

6. The electrode plate processing device according to claim 1, further comprising a waste collecting mechanism disposed downstream of the vacuum adsorption zone along the conveying direction.

7. The electrode plate processing device according to claim 6, further comprising a second air suction assembly communicating with the waste collecting mechanism, so as to produce a negative pressure in the waste collecting mechanism.

* * * * *